(12) United States Patent
Chortyk-White et al.

(10) Patent No.: US 9,072,278 B2
(45) Date of Patent: Jul. 7, 2015

(54) ANXIETY REDUCING ANIMAL GARMENT

(71) Applicant: Pet Edge, Inc., Beverly, MA (US)

(72) Inventors: Laryssa Chortyk-White, Salem, MA (US); Sandra Jauron-Siclari, Boston, MA (US); Danielle Weidman, Derry, NH (US)

(73) Assignee: PETEDGE, INC., Beverly, MA (US)

( * ) Notice: Subject to any disclaimer, the term of this patent is extended or adjusted under 35 U.S.C. 154(b) by 67 days.

(21) Appl. No.: 13/945,361

(22) Filed: Jul. 18, 2013

(65) Prior Publication Data

US 2015/0020755 A1  Jan. 22, 2015

(51) Int. Cl.
*A01K 15/00* (2006.01)
*A01K 13/00* (2006.01)
*A01K 27/00* (2006.01)

(52) U.S. Cl.
CPC .............. *A01K 13/006* (2013.01); *A01K 15/00* (2013.01); *A01K 13/008* (2013.01); *A01K 27/002* (2013.01)

(58) Field of Classification Search
CPC ..... A01K 13/006; A01K 15/02; A01K 29/00; A01K 13/00; A01K 15/022; A61D 9/00; A61H 2203/03; A61H 39/04
USPC ................. 119/856, 850, 905, 712, 863, 865; 54/79.1, 79.2, 79.4; 2/69.5, 90, 92, 96, 2/102, 912, 913, 914, 915; D30/145
See application file for complete search history.

(56) References Cited

U.S. PATENT DOCUMENTS

| | | | |
|---|---|---|---|
| 3,141,443 A * | 7/1964 | Huey | 119/854 |
| 4,355,600 A | 10/1982 | Zielinski | |
| 5,447,124 A * | 9/1995 | Pollock et al. | 119/850 |
| 5,996,537 A * | 12/1999 | Caditz | 119/850 |
| 6,142,105 A * | 11/2000 | McKnight | 119/850 |
| 6,234,117 B1 * | 5/2001 | Spatt | 119/850 |
| 6,431,123 B1 * | 8/2002 | Hibbert | 119/850 |
| 6,820,574 B2 | 11/2004 | Sharpe | |
| 7,131,399 B2 * | 11/2006 | Blommel | 119/712 |

(Continued)

OTHER PUBLICATIONS

International Search Report and Written Opinion of the International Searching Authority on International application No. PCT/US2014/046345, issued Nov. 14, 2014.

*Primary Examiner* — Yvonne Abbott-Lewis
(74) *Attorney, Agent, or Firm* — McCarter & English, LLP

(57) ABSTRACT

Exemplary embodiments of the present disclosure relate to an animal garment for relieving anxiety of a quadruped. The garment can include a neck portion forming a first terminal end of the garment, a hind portion forming a second terminal end of the garment, and a continuously formed torso portion having a surface extending between the neck portion and the hind portion. The surface of the torso portion includes a third terminal end and a fourth terminal end of the garment such that the neck portion, hind portion, third terminal end, and fourth terminal end define a perimeter of the garment. Exemplary embodiments of the garment can be formed to have a step-in construction with a pair of openings formed in the surface of the torso portion and disposed proximate to the neck portion. The pair openings can being configured to receive the front legs of the quadruped when the garment is in an open position. The third and fourth terminal ends are configured to be selectively fastened to each other in an overlapping arrangement along a back of the quadruped to position the garment in a closed position to secure the quadruped within the garment, and apply pressure to a torso of the quadruped.

32 Claims, 4 Drawing Sheets

(56) References Cited

U.S. PATENT DOCUMENTS

| | | | |
|---|---|---|---|
| D584,862 S * | 1/2009 | Kemper | D30/145 |
| D678,629 S * | 3/2013 | Powell | D30/145 |
| 8,459,211 B2 | 6/2013 | Blizzard | |
| 8,733,296 B1 * | 5/2014 | Douglas et al. | 119/850 |
| 8,863,699 B2 * | 10/2014 | Bishop | 119/850 |
| 2002/0121247 A1 * | 9/2002 | Sharpe | 119/820 |
| 2009/0183692 A1 * | 7/2009 | Rossi et al. | 119/850 |
| 2009/0205586 A1 | 8/2009 | Matthews | |
| 2010/0319632 A1 * | 12/2010 | Blizzard | 119/850 |
| 2011/0174237 A1 * | 7/2011 | Sanders-Luckman et al. | 119/792 |
| 2011/0231993 A1 * | 9/2011 | Schmid et al. | 5/494 |
| 2012/0024239 A1 | 2/2012 | Forbes | |
| 2012/0227679 A1 * | 9/2012 | Bishop | 119/850 |
| 2013/0186348 A1 * | 7/2013 | Blizzard | 119/850 |

* cited by examiner

ANXIETY REDUCING ANIMAL GARMENT

BACKGROUND

Exemplary embodiments relate to an animal garment for reducing anxiety of an animal.

Pets, such as dogs, can experience anxiety for many reasons. Such anxiety can be manifested by pets as physical and/or behavioral issues. Several method of treatment for anxiety exist including medication, behavior modification, and environment modification. In addition, it has been shown that applying pressure to a pet's body can aid in alleviating or reducing anxiety experienced by the pet. Such pressure can be applied via a garment worn by the pet that is specifically designed to alleviate and/or reduce a pet's anxiety.

Conventional animal garments designed for alleviating anxiety in a pet can be cumbersome and difficult to put on a pet. As an example, some conventional pet garments designed for alleviating anxiety in a pet must be pulled over the pet's head while also requiring the pet's front legs to be pulled through openings in the garment. As another example, some conventional garments for alleviating anxiety can require the pet owner to secure the garment around the pet at several different locations on the pet's body.

SUMMARY

Exemplary embodiments of the present disclosure are related to an animal garment for relieving anxiety of a quadruped. The animal garment can have a step-in construction for receiving a quadruped when the garment is in the open position and securing the garment on the quadruped in the closed position. The animal garment can have a neck portion, a hind portion, and a torso portion. The neck portion, hind portion, and/or torso portion can be formed from a resiliently elastic material, such as, for example, spandex and/or a spandex poly-blend. In exemplary embodiments, the neck portion forms a first terminal end of the garment and the hind portion forms a second terminal end of the garment. The torso portion can extend between the neck portion and the hind portion along a longitudinal axis and can include third and fourth terminal ends of the garment. The first, second, third, and fourth terminal ends can define a perimeter of the garment. In some embodiments, the perimeter of the garment is asymmetrical with respect to a central axis when the garment is in the open position.

The torso portion can have a continuously formed surface that extends between the neck portion and the hind portion. A pair of openings are formed in the continuously formed surface of the torso portion. The pair of openings can be disposed proximate to the neck portion to receive the front legs of the quadruped when the garment is in the open position. A perimeter of each of the openings includes an elastic band so that the perimeter of each of the openings can elastically expand to receive a front leg of a quadruped and can elastically contract about a portion of the front leg of the quadruped to apply pressure to a portion of the front leg.

The third and fourth terminal ends of the torso portion are configured to be selectively fastened in an overlapping arrangement with respect to each other along a back of the quadruped to position the garment in the closed position to secure the quadruped within the garment and apply pressure to the torso of the quadruped.

Each of the third and fourth terminal ends are associated with fastening members and the fourth terminal end can be arranged to overlap the third terminal end so that the fastening members mate with each other to secure the garment in the closed position. An amount of the pressure applied to the torso of the quadruped can be adjustable based on a degree to which the fourth terminal end overlaps the third terminal end. Likewise, an amount of pressure applied to the quadruped by the neck portion and the hind portion can be determined by the degree to which the fourth terminal end overlaps the third terminal end.

In some embodiments, the third terminal end can extend linearly along a longitudinal axis from the neck portion to the hind portion and a first fastening member associated with the third terminal end can also extend from the neck portion to the hind portion along the longitudinal axis. The first fastening member can have a curved shape that increases in distance from the third terminal end as the fastening member extends from the neck portion to a midpoint and decreases in distance from third terminal end as the first fastening member extends from the midpoint towards the hind portion.

In some embodiments, the fourth terminal end extends along the longitudinal axis from the neck portion to the hind portion and has a curved configuration that corresponds to a curvature of the first fastening member. A second fastening member associated with the fourth terminal end can be disposed adjacent to the fourth terminal end and can have a curvature that corresponds to the curvature of the first fastening member. The first fastening member can have a first width and the second fastening member can have a second width.

In some embodiments, the fourth terminal end can have a minimum possible overlap and a maximum possible overlap with respect to the third terminal end when the garment is in the closed position. The minimum possible overlap and the maximum possible overlap can be determined based on the first and second widths.

In some embodiments, the neck portion can include a tab having a first neck fastening member disposed thereon. The tab can be disposed proximate to the fourth terminal end and can extend beyond a portion of the fourth terminal end proximate to the neck portion. The first neck fastening member can be configured to mate with a second neck fastening member disposed on the neck portion proximate to the third terminal end when the garment is in the closed position.

In some embodiments, the hind portion can include a tab having a first hind fastening member disposed thereon. The tab can be disposed proximate to the fourth terminal end and can extend beyond a portion of the fourth terminal end proximate to the hind portion. The first hind fastening member can be configured to mate with a second hind fastening member disposed on the hind portion proximate to the third terminal end when the garment is in the closed position.

In some embodiments, the garment can include a coupling device attached to the hind portion, which can be configured to receive a leg loop to secure the hind portion to a hind area of the quadruped when the garment is in the closed position. The leg loop can be removably coupled to the coupling device.

In some embodiments, the torso portion can include a pouch disposed between the pair of openings in the torso portion of the garment to receive an aromatic material, such as lavender. The pouch can be disposed on an interior of the torso portion when the garment is in the closed position.

Any combination or permutation of embodiments is envisioned. Other objects and features will become apparent from the following detailed description considered in conjunction with the accompanying drawings, wherein like reference numerals identify like elements. It is to be understood, however, that the drawings are designed as an illustration only and not as a definition of the limits of the present disclosure.

DETAILED DESCRIPTION OF EXEMPLARY EMBODIMENTS

Exemplary embodiments of the present disclosure are directed to an animal garment for relieving anxiety of a quadruped (e.g., a dog). Exemplary embodiments of the animal garment can be a continuous unitary structure having a step-in construction including a pair of openings through which the quadruped's front legs extend. Side ends of exemplary embodiments of the garment can be wrapped around the sides of the quadruped and can be fastened to each other in an overlapping arrangement along the back and/or side of the quadruped to secure the garment to the quadruped. A degree to which the side ends overlap can be adjusted to adjust an amount of pressure applied to the quadruped by the garment.

Figure 1:
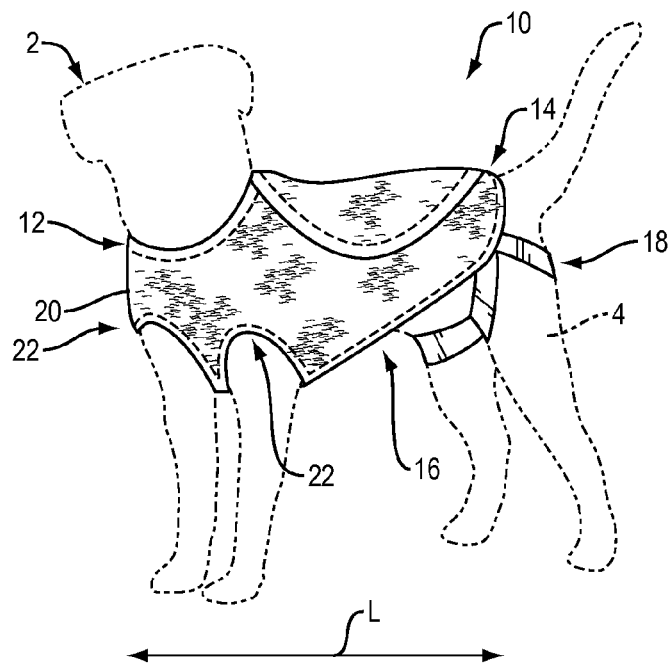
FIG. 1 depicts an exemplary embodiment of an animal garment for reducing anxiety of an animal wearing the garment in accordance with the present disclosure.

FIG. 1 depicts an exemplary embodiment of an animal garment 10 secured to a quadruped 2 to reduce and/or relieve anxiety of the quadruped 2 by applying pressure about the body 4 (e.g., the torso, neck, portions of the legs, etc.) of the quadruped 2. In the present embodiment, the garment 10 includes a neck portion 12, a hind portion 14, and a torso portion 16. The neck portion 12 and the hind portion 14 form first and second terminal ends of the garment 10, respectively. In exemplary embodiments, the garment 10 can be formed of a flexible resilient elastic material, such as spandex, a spandex poly blend, and/or any other suitable resilient elastic material.

The torso portion 16 extends along a longitudinal axis L between the neck portion 12 and the hind portion 14. The torso portion 16 can be continuously formed from the resilient elastic material defining an inner surface (FIG. 2) and an outer surface 20 of the garment 10. A pair of openings 22 can be formed in the torso portion 16. The openings 22 can be spaced apart from each other and can be disposed proximate to the neck portion 12 of the garment 10 for receiving the front legs of the quadruped 2. When the garment 10 is secured to the quadruped the inner surface of the garment 10 can press against the body of the quadruped 2.

Figure 2:
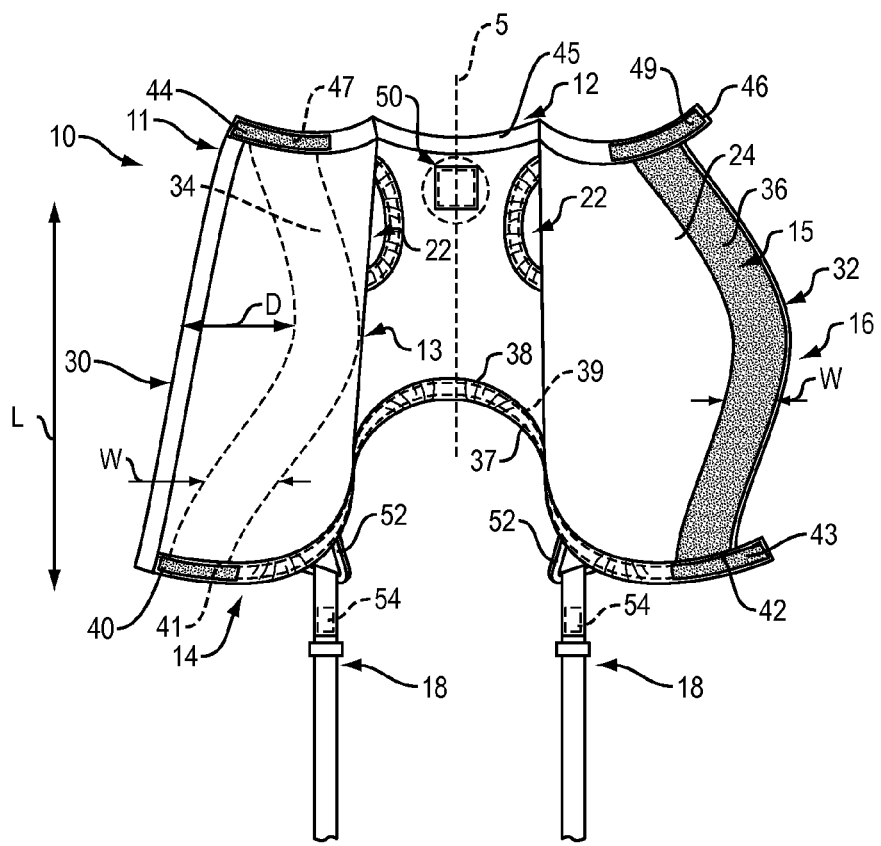
FIG. 2 depicts the animal garment of FIG. 1 in an unsecured open position in accordance with the present disclosure.

In exemplary embodiments, the garment 10 can have a step in configuration that requires the front legs of the quadruped to extend through the openings 22 when the garment 10 is in an open unsecured position (FIG. 2). After the front legs of the quadruped 2 are placed through the openings 22, the garment 10 can be wrapped around the quadruped 2 such that the continuously formed torso portion covers the quadruped 2 from the neck to its tail and hind legs. In the secured, closed position, the under body portion of the garment 10 can provide a continuous surface that presses against the underside of the body 4. The continuous surface of the torso portion 16 terminates at the neck portion 12, the hind portion 14, and side terminal ends (FIG. 2) of the torso portion 16, which are fastened to each other in an overlapping arrangement along the back and/or side of the quadruped 2 when the garment 10 is secured to the quadruped 2 (i.e. in the secured, closed position).

The pressure applied to the body 4 of the quadruped 2 by the garment 10 can be generated due to the elastic properties of the garment 10. The garment 10 can be stretched tightly around the quadruped 2 and can be secured to the quadruped by mating the side terminal ends together. The torso portion 16 can be adjustably fastened to vary an amount of pressure applied to the torso area of the quadruped 2. For example, a pressure applied to the quadruped 2 can be adjusted by adjusting a degree to which the side terminal ends of the torso portion 16 overlap. In some embodiments, the torso portion 16 can be configured to have a minimum possible overlap and a maximum possible overlap.

In some embodiments, leg loops 18 can be operatively coupled to the hind portion 14 of the garment 10 to maintain a fit of the garment 10 about a hind area of the quadruped 2. As one example, in some embodiment, one of the leg loops can be wrapped around each of the hind legs of the quadruped 2. As another example, in some embodiments, the leg loops can be wrapped around a rear of the quadruped 2. A length of the leg loops 18 can be adjusted to accommodate different sized quadrupeds. In some embodiments, the leg loops 18 can be removably coupled to the garment 10, as described herein.

FIG. 2 depicts the garment 10 of FIG. 1 in an unsecured or open position. As shown in FIG. 2, the first and second terminal ends formed by the neck portion 12 and the hind portion 14, respectively, along with side terminal ends 30 and 32 of the torso portion 16, define a perimeter 11 of the garment 10. The inner surface 24 (and outer surface 20, e.g., shown in FIG. 1) of the torso portion 16 can be substantially continuous from the neck portion 12 to the hind portion 14 and from the side terminal end 30 to the side terminal end 32 with the openings 22 formed therein.

The side terminal end 30 can extend along the longitudinal axis L in a generally linear manner. In exemplary embodiments, a fastening member 34 can be disposed on the outer surface of the garment 10. The fastening member 34 can extend a length of the torso portion 16 from the neck portion 12 to the hind portion 14 and can have a uniform width W. The fastening member 34 can have a curved shape. The curved shape of the fastening member 34 can extend from the neck portion 14 to the hind portion 14 along the longitudinal axis with an increasing distance D from the side terminal end 30 until a midpoint 13 between the neck portion 12 and the hind portion 14, at which point the distance D between the fastening member 34 and the side terminal end 30 begins to decrease as the fastening member extends towards the hind portion 14 from the mid-point 13.

The side terminal end 30 can be formed to extend generally linearly to provide a comfortable fit against the quadruped's body as opposed to a curved side terminal end which may press against different portions of the quadruped's body (e.g., spine, ribs, etc.). The linear configuration of the side terminal end 30 advantageously allows the side terminal end to contact the quadruped's body along the same general portion of the quadruped's body (e.g., slightly offset from the quadruped's spine).

The side terminal end 32 can extend along the longitudinal axis L in a generally curved manner. The curvature of the side terminal end 32 can generally correspond to the curvature of the fastening member 34. As shown in FIG. 2, an outline of the garment 10 is generally asymmetrical about a central axis 5 when the garment is in the unsecured open position due to, for example, the difference in the shapes of the side terminal ends 30 and 32. In exemplary embodiments, a fastening member 36 can be disposed on the inner surface 24 of the garment 10. The fastening member 36 can extend a length of the torso portion 16 from the neck portion 12 to the hind portion 14 and can have the uniform width W. The fastening member 36 can have a curved shape that generally corresponds to the curvature of the side terminal end 32 and the fastening member 34.

The fastening members 34 and 36 can be configured to mate with one another when the garment 10 is in the secured closed position so that the side terminal ends 30 and 32 of the torso portion 16 can be fastened to each other in an overlapping arrangement. An amount of pressure applied to the body of the quadruped by the torso portion 16 of the garment 10 can be adjusted by adjusting a degree to which the side terminal ends 30 and 32 of the torso portion 16 overlap. The side terminal ends 30 and 32 of the torso portion 16 can be configured to have a minimum possible overlap and a maximum possible overlap, which can be determined by the width W of the fastening members 34 and 36. The curved shape of the fastening members 34 and 36 advantageously facilitate securing the garment 10 to an quadruped by allowing the side terminal end 32 to be pulled over and across the side terminal end 30 by the mid-point 15 of the side terminal end so that the ends fastening members 34 and 36 and the midpoints 13 and 15 of the fastening members 34 and 36 generally align with one another without taking special care to ensure that the side terminal ends and/or the fastening members do not bunch up or misalign.

In one exemplary embodiment, the fastening members 34 and 36 can be formed as a hook and loop fastener, such as Velcro. The hook portion of the fastener can be embodied by the fastening member 36 and the loop portion of the fastener can be embodied by the fastening member 34.

The hind portion 14 can include an elastic strip 38 extending along the second terminal end formed by the hind portion 14 in a direction that is generally transverse to the longitudinal axis L. The elastic strip 38 can be formed of gathered material 37 having an elastic band 39 disposed within the gathered material 37. In some embodiments, when the garment 10 is in the secured closed position, the elastic strip 38 can be configured to apply more pressure to the body of the quadruped than the torso portion 16. In some embodiments, the elastic strip 38 can be configured to apply less pressure to the body of the quadruped than the torso portion 16.

In the present embodiment, the elastic strip 38 can extend between a first tab 40 disposed proximate to the side terminal end 30 and a second tab 42 disposed proximate to the side terminal end 32. The first tab 40 can include a fastening member 41 disposed on the outer surface (i.e. outer surface 20) and the second tab 42 can include a fastening member 43 disposed on the inner surface 24. The first tab 40 can extend along a portion of the hind portion 14 and can terminate flush with the side terminal end 30. The second tab 42 can extend along a portion of the hind portion 14 and can extend beyond a portion of the side terminal end 32 proximate to the hind portion 14, but can extend a distance substantially equal with a midpoint 15 of the side terminal end 32.

The fastening members 41 and 43 can be configured to mate with one another when the garment 10 is in the secured closed position so that the tabs 40 and 42 of the hind portion 14 can be fastened to each other in an overlapping arrangement. In exemplary embodiments, an amount of pressure applied to the hind area of the quadruped by the hind portion 14 of the garment 10 is generally not independently adjustably and can be determined by a degree to which the side terminal ends 30 and 32 of the torso portion 16 overlap.

In one exemplary embodiment, the fastening members 41 and 43 can be formed as a hook and loop fastener, such as Velcro. The hook portion of the fastener can be embodied by the fastening member 43 and the loop portion of the fastener can be embodied by the fastening member 41.

The neck portion 12 can include a strip 45 extending along the first terminal end formed by the neck portion 12 in a direction that is generally transverse to the longitudinal axis L. Unlike the hind portion 16 which includes an elastic strip having an elastic band, the strip 45 can be continuous formed with the torso portion 16 and can be devoid of an elastic band. When the garment 10 is secured closed position, the strip 45 can be configured to approximately apply an equal amount of pressure to the body of the quadruped as the torso portion 16.

In the present embodiment, the strip 45 can extend between a first tab 44 disposed proximate to the side terminal end 30 and a second tab 46 disposed proximate to the side terminal end 32. The first tab 44 can include a fastening member 47 disposed on the outer surface (i.e. outer surface 20) and the second tab 46 can include a fastening member 49 disposed on the inner surface 24. The first tab 44 can extend along a portion of the neck portion 12 and can terminate flush with the side terminal end 30. The second tab 46 can extend along a portion of the neck portion 12 and can extend beyond a portion of the side terminal end 32 proximate to the neck portion 12, but can extend a distance substantially equal with the midpoint 13 of the side terminal end 32. The fastening members 47 and 49 can be configured to mate with one another when the garment 10 is in the secured closed position so that the tabs 44 and 46 of the neck portion 12 can be fastened to each other in an overlapping arrangement. In exemplary embodiments, an amount of pressure applied to the neck area of the quadruped by the neck portion 12 of the garment 10 is generally not independently adjustably and can be determined by a degree to which the side terminal ends 30 and 32 of the torso portion 16 overlap.

In one exemplary embodiment, the fastening members 47 and 49 can be formed as a hook and loop fastener, such as Velcro. The hook portion of the fastener can be embodied by the fastening member 49 and the loop portion of the fastener can be embodied by the fastening member 47.

In exemplary embodiments, a pouch 50 can be formed on the torso portion 16. The pouch 50 can be positioned between the openings 22 and proximate to the neck portion 12. The pouch 50 can be configured to hold an aromatic material, such as lavender. Positioning the pouch proximate to the neck portion 12 allows the aromatic material to be placed near the nose of the quadruped when the garment 10 is secured to the quadruped. The aromatic material can provide a scent that when smelled by the quadruped may reduce anxiety of the quadruped. In the present embodiment, the pouch 50 can be formed on the inner surface 24 of the torso portion. Forming the pouch 50 on the inner surface 24 of the torso portion 16 allows the aromatic material to be position near the nose of the quadruped without allowing the quadruped to access the material. In some embodiments, the pouch 50 can be formed on the outer surface of the torso portion 16 and can include a closure that can be fastened to prevent the quadruped from accessing the aromatic material.

Figure 5:
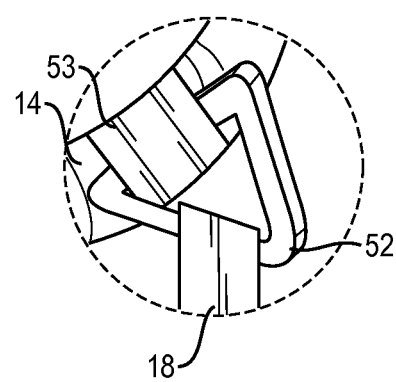
FIG. 5 is a detailed view of a coupling between an exemplary embodiment of the animal garment and a leg loop in accordance with the present disclosure.

Referring to FIGS. 2 and 5, the garment 10 can include coupling devices 52 to operatively attached the leg loops 18 to the garment 10. The coupling devices 52 can have a triangular structure and the leg loops 18 can wrap around one of the sides of the triangular structures. In the present embodiment, a pair coupling devices 52 are provided for each of the leg loops 18. In exemplary embodiments, the leg loops 18 can be selectively coupled to the coupling devices 52 via fastening members 54 disposed on the leg loops 18. In present embodiment, the coupling devices 52 can be connected to the hind portion 14 of the garment 10 via fabric loops 53 (FIG. 5) disposed around the coupling devices 52 and sewn into the hind portion 14.

Figure 3:
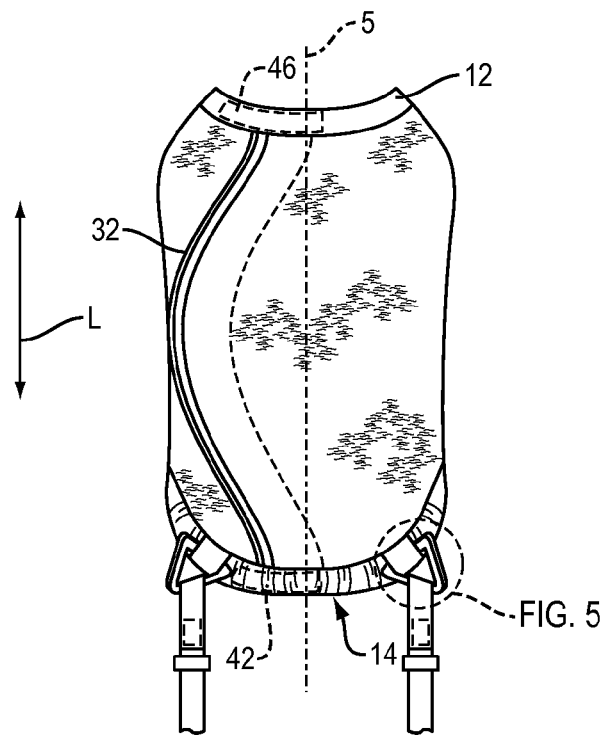
FIG. 3 depicts a top view of the animal garment of FIG. 1 in a secured closed position in accordance with the present disclosure.
Figure 4:
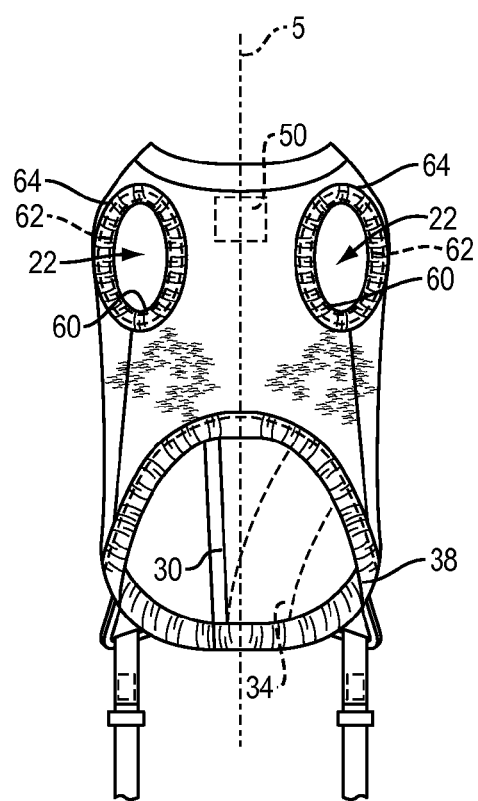
FIG. 4 depicts a bottom view of the animal garment of FIG. 1 in a secured closed position in accordance with the present disclosure.

FIG. 3 depicts a top view of the garment 10 in the secured closed position and FIG. 4 depicts a bottom view of the garment 10 in the secured closed position. Referring to FIGS. 3 and 4, the side terminal end 32 overlaps the side terminal end 30 so that the fastening members of the side terminal ends 30 and 32 engage and mate with each other along a back and/or side of a quadruped and offset from the central axis 5. Likewise, the fastening members of the neck portion 12 mate with each other and the fastening members of the hind portion 14 mate with each other as described herein. As shown in FIG. 3, the extension of the tabs 42 and 46 beyond the proximate portion of the side terminal end 32 provide structural stability to the garment 10 in the secured closed position to ensure a secure fit of the garment 10 on the quadruped and to reduce and/or prevent the garment from loosening and/or coming apart at the neck portion 12 and/or the hind portion 14. As described herein, an amount of pressure applied to the body of the quadruped can be adjustable by adjusting a degree to which the side terminal end 32 overlaps the side terminal end 30. As further described herein, in exemplary embodiments, an amount of pressure applied by the neck portion 12 and the hind portion 14 is generally not individually adjustably, but is determined by the degree to side terminal ends 30 and 32 overlap.

As shown in FIG. 4, a perimeter 60 of the openings 22 can include gathered material 62 disposed about an elastic band 64. The elastic band 64 can be configured so that the perimeter 60 of the each of the openings 22 is fitted about and against a portion of the quadruped's front legs. The gathered material 62 and elastic band 64 can permit dimensions of the perimeter 60 (e.g., a diameter) to change to accommodate different sized quadrupeds while still fitting tightly around the quadruped's leg to apply pressure to a portion of the quadruped's legs.

Figure 6:
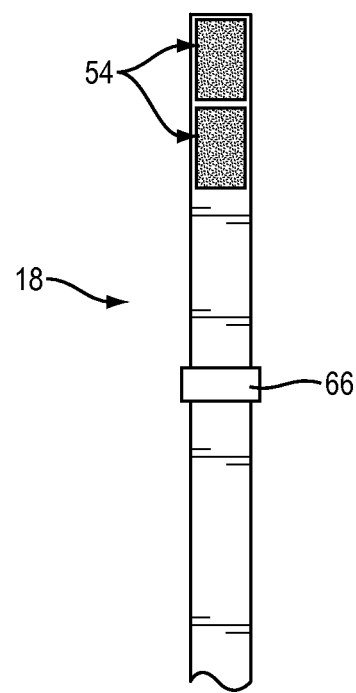
FIG. 6 depicts an exemplary embodiment of a leg loop that can be operatively coupled to exemplary embodiments of the animal garment in accordance with the present disclosure.

FIG. 6 depicts an exemplary embodiment of one of the leg loops 18. The leg loop 18 includes the fastening members 54 (e.g., a hook and loop fastener, such as Velcro) disposed adjacently to each other on the same side of the leg loop 18. The leg loop 18 can be attached to the coupling device sewn into the garment 10 by wrapping the fastening members 54 of leg loop 18 about the coupling device 52 and mating the fastening members 54 together, as shown in FIGS. 2-5. In exemplary embodiments, the leg loop 18 can include an elastic slider 66 configured to secure an excess portion of the length of the leg loop when the leg loop is secured about the hind area of the quadruped.

Figure 7:
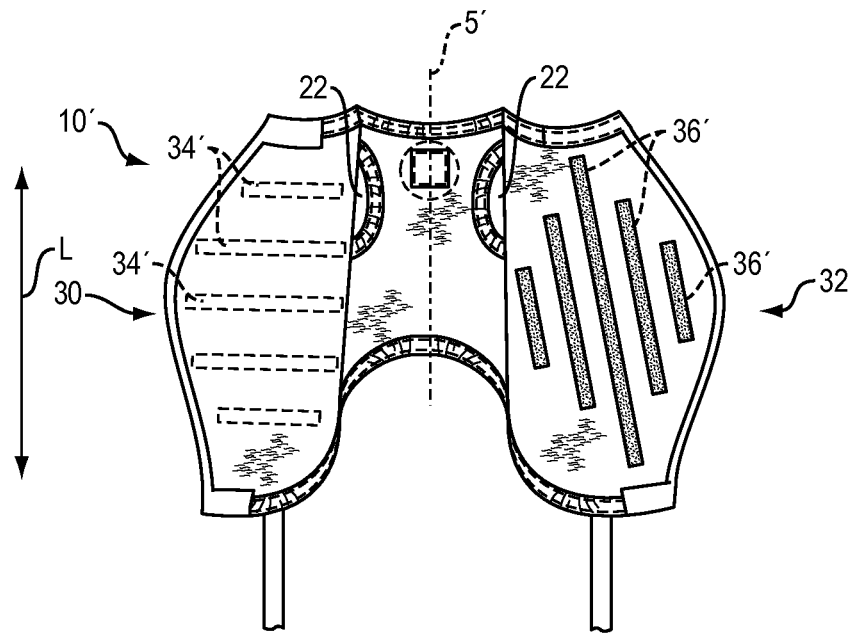
FIG. 7 depicts another exemplary embodiment of an animal garment for reducing anxiety in an animal wearing the animal garment shown in the unsecured open position in accordance with the present disclosure.
Figure 8:
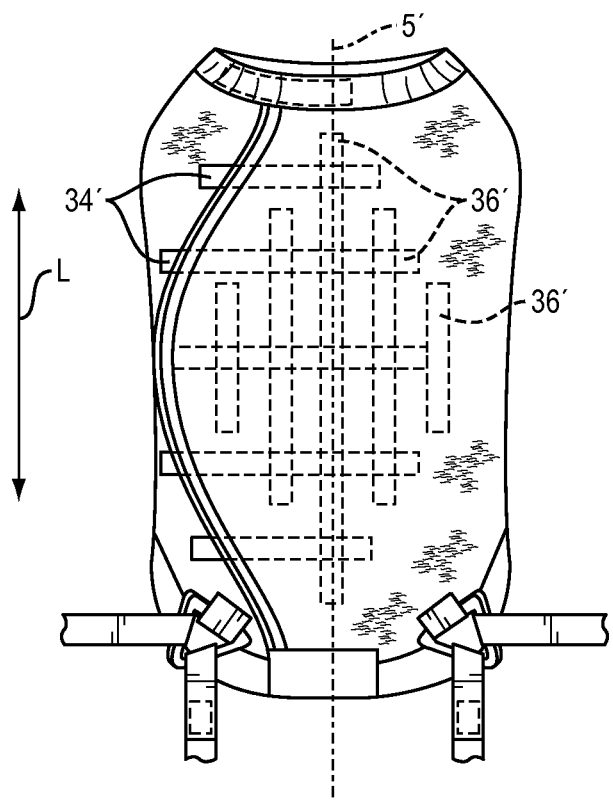
FIG. 8 depicts a top view of the animal garment of FIG. 7 in a secured closed position in accordance with the present disclosure.

FIGS. 7 and 8 depict another exemplary quadruped garment 10' that can be secured to a quadruped to reduce and/or relieve anxiety of the quadruped by applying pressure about the body (e.g., the torso, neck, portions of the legs, etc.) of the quadruped. Exemplary embodiments of the garment 10' can be similar to the garment 10 except with respect the side terminal ends 30' and 32' of the garment 10'. In the present embodiment, as shown in FIG. 7, the outline of the garment 10' can be approximately symmetrical about the central axis 5. The side terminal ends 30' and 32' can both have a curved shape that is similar to the curved shape of the side terminal end 32.

The side terminal ends 30' and 32' include fastening members 34' and 36', respectively. The fastening members 34' can be implemented as strips extending transverse to the longitudinal axis L and the fastening members 36' can be implemented as strips extending along the longitudinal axis L. A length of adjacent ones of the fastening members 34' and 36' can be different from each other. As shown in FIG. 7, when the garment 10' is in the secured closed position, the side terminal end 32' overlaps the side terminal 30' and the fastening members 36' engage the fastening members 34' to form a grid or crisscrossed pattern.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. An animal garment for relieving anxiety of a quadruped comprising:
    a neck portion forming a first terminal end of the garment;
    a hind portion forming a second terminal end of the garment;
    a continuously formed torso portion having a surface extending between the neck portion and the hind portion, the surface of the torso portion including a third terminal end and a fourth terminal end of the garment; and
    a pair of openings formed in the surface of the torso portion and disposed proximate to the neck portion, the pair openings being configured to receive the front legs of the quadruped when the garment is in an open position,
    wherein the third and fourth terminal ends are configured to be selectively fastened in an overlapping arrangement with respect to each other along a back of the quadruped to position the garment in a closed position to secure the quadruped within the garment and apply pressure to the torso of the quadruped, and
    wherein a first fastening member associated with the third terminal end extends from the neck portion to the hind portion along a longitudinal axis having a curved shape with an increasing distance away from the third terminal end from the neck portion to a midpoint and with a decreasing distance from the midpoint towards the hind portion.

2. The garment of claim 1, wherein the fourth terminal end is associated with a second fastening member and the fourth terminal end is configured to overlap the third terminal end so that the first and second fastening members mate with each other.

3. The garment of claim 2, wherein an amount of the pressure applied to the quadruped is adjustable based on a degree to which the fourth terminal end overlaps the third terminal end.

4. The garment of claim 3, wherein an amount of pressure applied to the quadruped by the neck portion and the hind portion is determined by the degree to which the fourth terminal end overlaps the third terminal end.

5. The garment of claim 1, wherein the first, second, third, and fourth terminal ends define a perimeter of the garment.

6. The garment of claim 5, wherein the perimeter of the garment is asymmetrical with respect to a central axis when the garment is in the open position.

7. The garment of claim 1, wherein the third terminal end extends linearly along the longitudinal axis from the neck portion to the hind portion.

8. The garment of claim 1, wherein the fourth terminal end extends along the longitudinal axis from the neck portion to the hind portion having a curved configuration that corresponds to a curvature of the first fastening member.

9. The garment of claim 8, wherein a second fastening member associated with the fourth terminal end is disposed adjacent to the fourth terminal end and has a curvature that corresponds to the curvature of the first fastening member.

10. The garment of claim 9, wherein the first fastening member has a first width and the second fastening members each has a second width.

11. The garment of claim 10, wherein the fourth terminal end has a minimum possible overlap and a maximum possible overlap with respect to the third terminal end in the closed position, the minimum possible overlap and the maximum possible overlap being determined based on the first and second widths.

12. The garment of claim 1, wherein the neck portion includes a first tab having a first neck fastening member disposed thereon, the first tab being disposed proximate to the fourth terminal end and extending beyond a portion of the fourth terminal end proximate to the neck portion, the first neck fastening member configured to mate with a second neck fastening member disposed on the neck portion proximate to the third terminal end when the garment is in the closed position.

13. The garment of claim 1, wherein the hind portion includes a first tab having a first hind fastening member disposed thereon, the first tab being disposed proximate to the fourth terminal end and extending beyond a portion of the fourth terminal end proximate to the hind portion, the first hind fastening member configured to mate with a second hind fastening member disposed on the hind portion proximate to the third terminal end when the garment is in the closed position.

14. The garment of claim 1, further comprising a coupling device attached to the hind portion and configured to receive a leg loop to secure the hind portion to a hind area of the quadruped when the garment is in the closed position.

15. The garment of claim 14, wherein the leg loop is removably coupled to the coupling device.

16. The garment of claim 1, wherein the torso portion includes a pouch disposed between the pair of openings to receive an aromatic material.

17. The garment of claim 16, wherein the pouch is disposed on an interior of the torso portion when the garment is in the closed position.

18. The garment of claim 1, wherein a perimeter of each of the openings includes an elastic band.

19. The garment of claim 18, wherein the perimeter of each of the openings is configured to elastically expand to receive a front leg of a quadruped and configured to elastically contract about a portion of the front leg of the quadruped to apply pressure to a portion of the front leg.

20. The garment of claim 1, wherein the torso portion is formed from at least one of a spandex material and a spandex poly-blend material.

21. An animal garment for relieving anxiety of a quadruped comprising:
 a neck portion forming a first terminal end of the garment;
 a hind portion forming a second terminal end of the garment;
 a continuously formed torso portion having a surface extending between the neck portion and the hind portion, the surface of the torso portion including a third terminal end and a fourth terminal end of the garment; and
 a pair of openings formed in the surface of the torso portion and disposed proximate to the neck portion, the pair openings being configured to receive the front legs of the quadruped when the garment is in an open position,
 wherein the third and fourth terminal ends are configured to be selectively fastened in an overlapping arrangement with respect to each other along a back of the quadruped to position the garment in a closed position to secure the quadruped within the garment and apply pressure to the torso of the quadruped, and
 wherein the neck portion includes a first tab having a first neck fastening member disposed thereon, the first tab being disposed proximate to the fourth terminal end and extending beyond a portion of the fourth terminal end proximate to the neck portion, the first neck fastening member configured to mate with a second neck fastening member disposed on the neck portion proximate to the third terminal end when the garment is in the closed position.

22. The garment of claim 21, wherein each of the third and fourth terminal ends are associated with fastening members and the fourth terminal end is configured to overlap the third terminal end so that the fastening members mate with each other.

23. The garment of claim 21, wherein a first fastening member associated with the third terminal end extends from the neck portion to the hind portion along a longitudinal axis having a curved shape with an increasing distance away from the third terminal end from the neck portion to a midpoint and with a decreasing distance from the midpoint towards the hind portion.

24. The garment of claim 23, wherein the fourth terminal end extends along the longitudinal axis from the neck portion to the hind portion having a curved configuration that corresponds to a curvature of the first fastening member.

25. The garment of claim 24, wherein a second fastening member associated with the fourth terminal end is disposed adjacent to the fourth terminal end and has a curvature that corresponds to the curvature of the first fastening member.

26. The garment of claim 21, wherein the hind portion includes a first tab having a first hind fastening member disposed thereon, the first tab being disposed proximate to the fourth terminal end and extending beyond a portion of the fourth terminal end proximate to the hind portion, the first hind fastening member configured to mate with a second hind fastening member disposed on the hind portion proximate to the third terminal end when the garment is in the closed position.

27. An animal garment for relieving anxiety of a quadruped comprising:
- a neck portion forming a first terminal end of the garment;
- a hind portion forming a second terminal end of the garment;
- a continuously formed torso portion having a surface extending between the neck portion and the hind portion, the surface of the torso portion including a third terminal end and a fourth terminal end of the garment; and
- a pair of openings formed in the surface of the torso portion and disposed proximate to the neck portion, the pair openings being configured to receive the front legs of the quadruped when the garment is in an open position,
- wherein the third and fourth terminal ends are configured to be selectively fastened in an overlapping arrangement with respect to each other along a back of the quadruped to position the garment in a closed position to secure the quadruped within the garment and apply pressure to the torso of the quadruped, and
- wherein the hind portion includes a first tab having a first hind fastening member disposed thereon, the first tab being disposed proximate to the fourth terminal end and extending beyond a portion of the fourth terminal end proximate to the hind portion, the first hind fastening member configured to mate with a second hind fastening member disposed on the hind portion proximate to the third terminal end when the garment is in the closed position.

28. The garment of claim 27, wherein each of the third and fourth terminal ends are associated with fastening members and the fourth terminal end is configured to overlap the third terminal end so that the fastening members mate with each other.

29. The garment of claim 27, wherein a first fastening member associated with the third terminal end extends from the neck portion to the hind portion along a longitudinal axis having a curved shape with an increasing distance away from the third terminal end from the neck portion to a midpoint and with a decreasing distance from the midpoint towards the hind portion.

30. The garment of claim 29, wherein the fourth terminal end extends along the longitudinal axis from the neck portion to the hind portion having a curved configuration that corresponds to a curvature of the first fastening member.

31. The garment of claim 30, wherein a second fastening member associated with the fourth terminal end is disposed adjacent to the fourth terminal end and has a curvature that corresponds to the curvature of the first fastening member.

32. The garment of claim 27, wherein the neck portion includes a first tab having a first neck fastening member disposed thereon, the first tab being disposed proximate to the fourth terminal end and extending beyond a portion of the fourth terminal end proximate to the neck portion, the first neck fastening member configured to mate with a second neck fastening member disposed on the neck portion proximate to the third terminal end when the garment is in the closed position.

* * * * *